United States Patent [19]

Shiskin

[11] Patent Number: 4,800,826
[45] Date of Patent: Jan. 31, 1989

[54] AGRICULTURAL MACHINE

[76] Inventor: Viktor V. Shiskin, ulitsa Festivalnaya, 16, kv. 5, Krasnodar, U.S.S.R.

[21] Appl. No.: 110,711

[22] PCT Filed: Dec. 17, 1986

[86] PCT No.: PCT/SU86/00129
§ 371 Date: Jul. 16, 1987
§ 102(e) Date: Jul. 16, 1987

[87] PCT Pub. No.: WO87/03776
PCT Pub. Date: Jul. 2, 1987

[30] Foreign Application Priority Data

Dec. 24, 1985 [SU] U.S.S.R. ............... 3989052
Dec. 24, 1985 [SU] U.S.S.R. ............... 3989054
Dec. 24, 1985 [SU] U.S.S.R. ............... 3989053

[51] Int. Cl.⁴ .......................... A01C 7/00; A01C 7/04; A01C 15/04; A01C 91/02
[52] U.S. Cl. .......................................... 111/1; 111/11
[58] Field of Search ..................... 47/1 A, 9, 56; 111/10–13, 34, 1, 2, 3

[56] References Cited

U.S. PATENT DOCUMENTS 2,743,932 5/1956 Wester ..................... 111/10
4,724,781 1/1988 Higashimura et al. ........ 47/56

FOREIGN PATENT DOCUMENTS 257899 1/1971 U.S.S.R. .
803885 2/1981 U.S.S.R. .
897175 1/1982 U.S.S.R. .
908262 2/1982 U.S.S.R. .

Primary Examiner—Charles T. Jordan
Assistant Examiner—Michael J. Carone
Attorney, Agent, or Firm—Burgess, Ryan & Wayne

[57] ABSTRACT

An agricultural machine comprises a frame (1) carrying a hopper (2) for a fluid material, the hopper (2) is located in a sealed chamber (4) having an inlet communicated with a source (5) of working fluid and a device for causing the fluid material to move which is made in the form of a driven drum (6) having a flexible hose (7) wound thereon. The interior space (8) of the hose (7) communicates with the hopper (2). The free end of the hose (7) is extended through the inlet of the chamber (4) being turned inside out and sealingly secured to and along the perimeter of the chamber (4) so as to define an annular space (A).

10 Claims, 3 Drawing Sheets

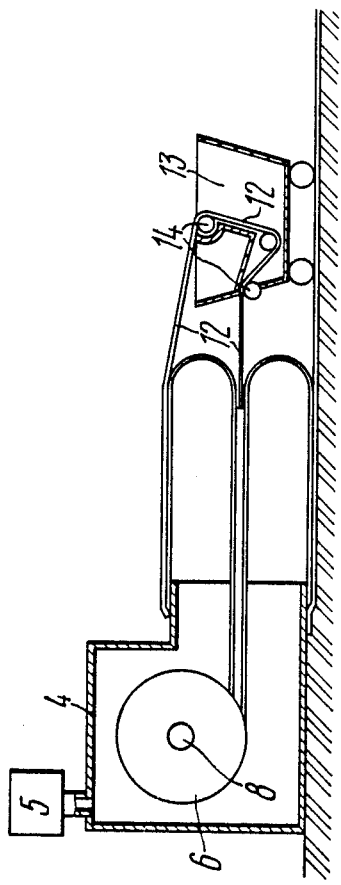
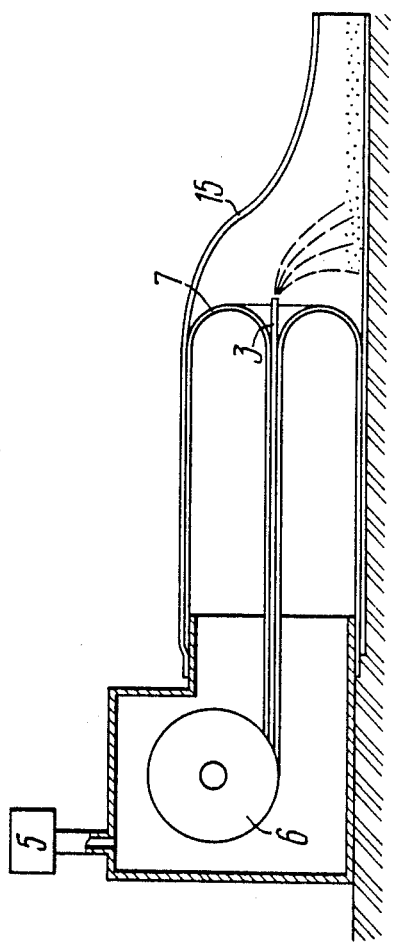

4,800,826

AGRICULTURAL MACHINE

TECHNICAL FIELD

The invention relates to the agricultural engineering, and in particular to an agricultural machine designed for seeding agricultural plants and for cultivation of young crop as well as for growing plants under artificial and natural climatic conditions.

The agricultural machine may also be used for harvesting.

BACKGROUND OF THE INVENTION

Known in the art is a process for cultivating plants without soil, in water-proofed containers, with the roots being disposed in a zonal system and being fed with a nutrient solution, the ionized air flow acting upon the top part of the plants. An apparatus for carrying out the process comprises a water-proofed container having a system of zones for accommodation of roots of the plants and means for supplying nutrient and ozone-air mixtures to the plants (cf. USSR Inventor's Certificate No. 897175, Cl. 01 G 31/02, publ. 1980).

This apparatus is deficient in a low capacity and great labour effort in growing plants. The process capabilities are limited since the apparatus can only carry out one operation, namely, seeding of plants.

Known in the art is also an agricultural machine having a frame supporting a hopper for a fluid material and a device for causing the fluid material to move towards a working implement for carrying out production operations in the field, a motor comprising a milling cutter implement, a non-row seeding apparatus being provided downstream the implement and communicating with a seed duct of the seed hopper.

The seeding apparatus comprises a tube perforated along the entire length thereof, which extends horizontally transversely with respect to the direction of movement of the machine, the tube having a drive means for imparting reciprocations thereto in the direction along the tube axis (cf. USSR Inventor's Certificate No. 908262, Cl. A 01 C 7/00, 1979). This apparatus can perform one production operation only, namely seeding of plants, the apparatus exerting a strong specific pressure upon soil since the frame moves along the field and carried reagents and a stock of seeds or seedings so that soil is overcompacted. Other auxiliary agricultural machines are necessary for fertilizing soil, harvesting and irrigation.

SUMMARY OF THE INVENTION

It is an object of the present invention to eliminate the above-described disadvantages of the prior art.

It is the main object of the present invention to create an agricultural machine maving a device for causing a fluid material to move, which would provide a fluid material supply to any point of a field being treated independently of motion of the agricultural machine.

This object is accomplished by that in an agricultural machine comprising a frame carrying a hopper for a fluid material and a device for causing the fluid material to move towards a working implement for carrying out production operations in the field, according to the invention, the hopper is located in a sealed chamber having an inlet communicated with a source of working fluid supplied to the chamber under pressure, the device comprising a driven drum having a flexible hose would thereon and accommodated in the sealed chamber in such a manner that the interior space thereof communicates with the hopper for a fluid material, the free end of the hose extending through an outlet of the chamber, being turned inside out and sealingly secured to and along the perimeter of the chamber so as to define an annular space, the volume of the annular space varying under pressure of working fluid to cause the fluid material to move.

This construction of the machine makes it possible to ensure supply of a fluid material to any point in the field being treated without moving the frame of the agricultural machine, the production capabilities of the machine being substantially enlarged.

The driven drum is preferably mounted on a shaft in a reversible manner so as to perform operations in the field during both work- and return travels of the working implement.

The hopper for a fluid material may be formed by the inner walls of the hose. This makes the device more compact and simplifies its structure.

For improving productivity of the agricultural machine and to enlarge the range of fluid materials being handled, the machine may be provided with auxiliary hoppers mounted outside the sealed chamber and communicating with the interior space of the hose through a hollow shaft of the drum.

A traction member is preferably provided, which has its ends secured to the hose. This facilty enlarges production capabilities of the machine since various working implements such as transportation containers can be moved around in the field.

The traction member is preferably made with two runs so as to increase the traction load at a working implement being transported on certain soils.

One embodiment of the agricultural machine involves an operative connection of the traction member with a working implement for carrying out production operations in the field, the working implement comprising a transportation container having rollers, the traction member extending around the rollers. This facility makes it possible to mechanize harvesting concurrently with the transportation of the harvest to the handling site.

In another embodiment the agricultural machine may have an auxiliary perforated hose mounted coaxially with the first mentioned hose and having one end thereof secured thereto, the other end of the perforated hose being secured to the field surface when in the working position. This modification of the machine substantially enlarges the range of terrains suitable for cultivation of plants using the process employed in the machine.

For a better matching in carrying out various production operations in the field, the transportation container may be made in the form of two sections mounted on either side of the hose and interconnected by means of a radius knife engaging the outer surface of the perforated hose. This structural embodiment allows different production operations to be combined in one and the same machine, and substantial mechanization of different operations is achieved.

The invention provides for its use in various fields of science and technology since the machine has a low weight, is simple in manufacture and reliable in operation. Comfort is ensured for operator. One of the main advantages of the agricultural machine according to the invention is the combining therein of a number of production operations carried out in the field, and in particular, without moving the machine proper around in the field.

BRIEF DESCRIPTION OF THE DRAWINGS

Specific embodiments of an agricultural machine according to the invention will now be described with reference to the accompanying drawings, in which:

FIG. 3 is an embodiment of a machine having a traction member and a transportation container;

FIG. 4 is an embodiment of a machine having a perforated hose;

BEST MODE FOR CARRYING OUT THE INVENTION

Figure 1:
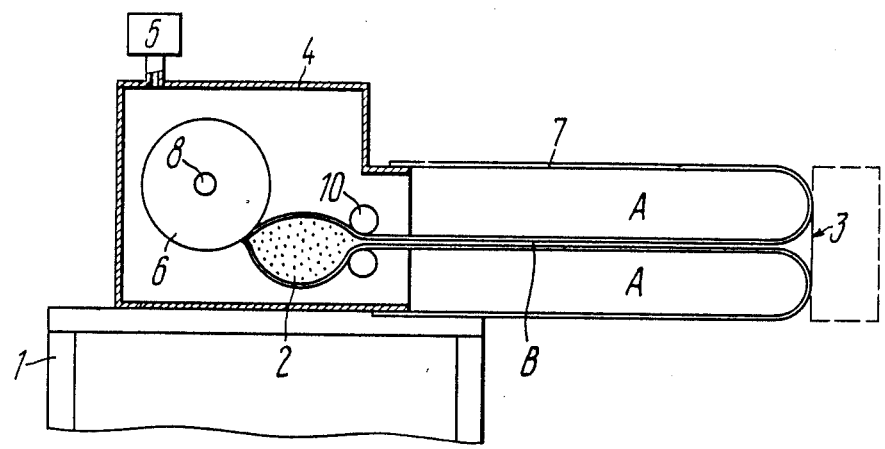
FIG. 1 schematically shows a machine in longitudinal section.

An agricultural machine (FIG. 1) has a frame of a box-shaped section 1 carrying a hopper 2 for a fluid material (such as seeds) and a device for causing the fluid material to move towards a working implement 3 for carrying out production operations in the field. The working implement may be in the form of any appropriate known means such as a plowshare, a nozzle, a fertilizer spreader, and the like.

Figure 2:
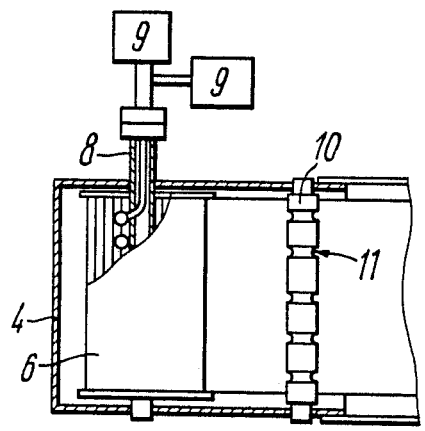
FIG. 2 is a plan view of a drum accommodated in a chamber.

The hopper 2 is disposed in a sealed chamber 4 which has an inlet communicating with a source 5 of working fluid such as an air and gas mixture supplied to the chamber 4 under pressure. The device for causing the fluid material to move comprises a driven drum 6 having a flexible hose 7 wound thereon. The drum 6 is mounted on a hollow shaft 8 and is disposed inside the sealed chamber 4. The drum drive is reversible and is operatively connected to an engine of the agricultural machine (not shown in the drawing). The free end of the hose 7 extends through the outlet of the chamber 4, is turned inside out and sealingly secured to, and along the perimeter of the chamber 4 so as to define an annular space A. The interior space B of the hose 7 communicates with the hopper 2. The latter may be formed by the inner walls of the hose 7. The frame 1 may carry auxiliary hoppers 9 (FIG. 2) mounted outside the chamber 4 and serving as magazines for various fluid materials, e.g. liquid fertilizers, water, and the like. The hoppers 9 communicate with the interior space of the hose 7 through the hollow shaft 8 of the drum 6. A metering device for supplying the fluid material from the hopper 2 is accommodated in the sealed chamber 4 (FIG. 1) and comprises a set of profiled rollers 10 having grooves 11 (FIG. 2). The width of the grooves 11 is chosen to pre-set seeding rate. During supply of fluid materials from the auxiliary hoppers 9 the metering device does not take part in operation since the material is supplied at already metered rate. A removable traction member 12 (FIG. 3) has its ends secured to the hose 7 and may consist of two runs. The traction member 12 ensures transportation of a working member, and more specifically, of a transportation container 13 during harvesting. The transportation container 13 has rollers 14, the traction member 12 extending around the rollers. This construction ensures the operative connection of the traction member with the working implement.

FIG. 4 shows an embodiment in which the machine also comprises a perforated hose 15 which is mounted coaxially with the hose 7 and has one end thereof secured thereto. The other end of the perforated hose 15 is to be secured to the surface of the field when in the working position. The hose 15 is designed for supplying thereto a fluid material, and more specifically, seeds and for cultivating plants therein. It can also be used during seeding.

Figure 5:
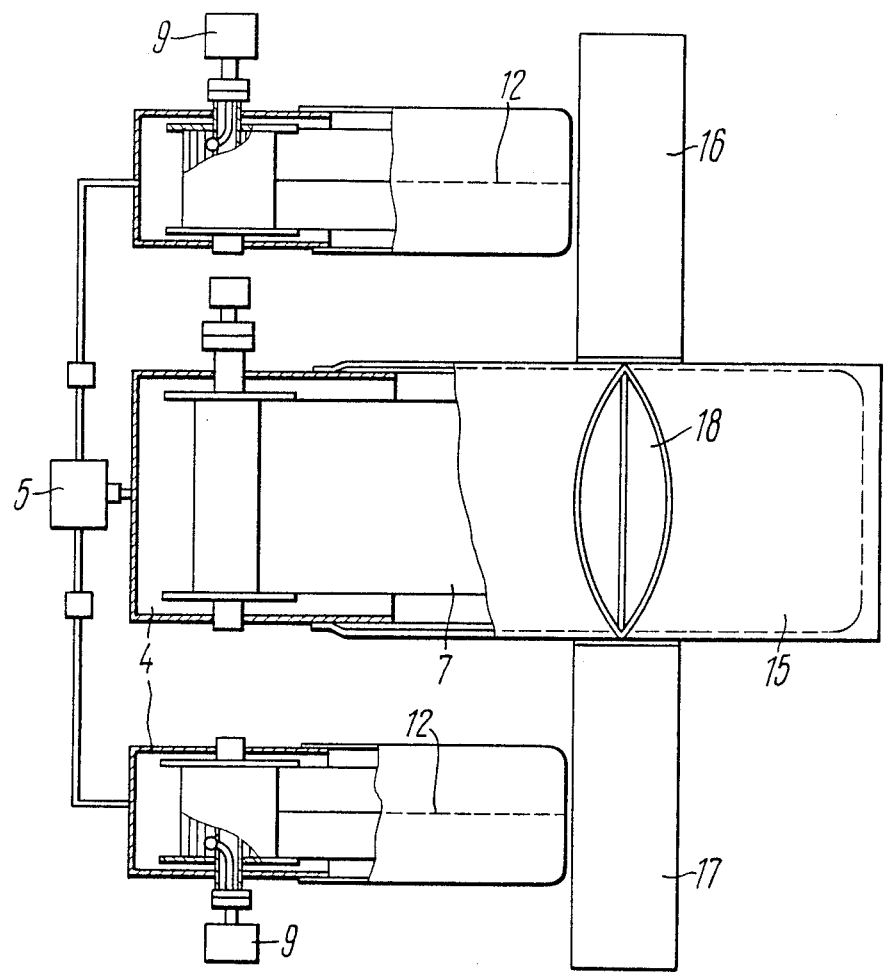
FIG. 5 is an embodiment of a machine for harvesting.

FIG. 5 shows an embodiment of the machine for carrying out closing production operations associated with harvesting. For collecting harvest from the surface of the hose 15, use is made of the transportation container 13 made up of two sections 16, 17 interconnected by means of a radius knife 18. The knife 18 is mounted so as to engage the outer surface of the perforated hose 15. Each section 16, 17 is caused to move around over the field surface similarly to the container 13 of FIG. 3.

The machine functions in the following manner.

The source 5 of working fluid (FIG. 1) is turned-on, and the working fluid is pumped into the sealed chamber 4. The hose 7 wound on the drum 6 starts turning inside out and moves along the surface of the field while being unwound from the drum because of a change in volume of the annular space A and concurrently supplies the fluid material from the hopper 2 towards the working implement 3. The rate of material supply depends on the speed of movement of the hose 7 and width of the grooves 11 (FIG. 2) of the metering device. The hose 7 is returned to the initial position (FIG. 1) when working fluid supply to the chamber 4 is stopped, and rotation of the drum 6 is reversed. The working fluid from the annular spaces A of the hose 7 is displaced by the hose back to the source 5 or into atmosphere. If seeds are used as fluid material, the hose is wound on the drum after the sown seeds have germinated. Then the germinated plants are fertilized and irrigated from the auxiliary hoppers 9 (FIG. 2). When fluid materials are fed from the auxiliary hoppers 9 which are mounted outside the chamber 4, the metering device does not come into play because the material is metered by the hoppers 9 (FIG. 2).

The abovedescribed cycle may be repeated any desired number of times.

If necessary, and also during harvesting, the abovedescribed machine can be used for the transportation around the field of different working implements such as transportation containers. For that purpose, the traction member 12 (FIG. 3) is secured to the hose and operatively connected to the working implement.

When sowing on soils that are not suitable for agricultural activities, use is made of the auxiliary perforated hose 15 (FIG. 4) in which is coaxially inserted the hose 7. One end of the perforated hose 15 is secured to the hose 7 and the other end is secured to the surface of the field. The hose 7 is used for partly filling the interior space of the perforated hose 15 with a fluid material so as to form a fertile bed therein. In this case the fluid material is in the form of a preliminarily prepared mix of soil and seeds. The hose 7 is then removed out of the perforated hose 15. The seeds germinate through perforation of the hose 15 to appear outside with the leaves, the roots remaining within the fertile bed. After ripening of the harvest, the hose 7 (FIG. 5) is again moved into the perforated hose 15 so as to separate the plants from the substrate. The plants are now in the top part of the hose 15. Then the radius knife 18 is installed on the perforated hose and connected to the sections 16, 17 of the transportation container. By moving the latter in the field, the radius knife 18 will cut-off the grown plants over the outer surface of the perforated hose 15. The cut plants are fed to the sections 16, 17 of the container. The container is moved around in the field by means of the traction member 12.

INDUSTRIAL APPLICABILITY

The invention may be used for various agricultural operations in the field and also for unfavourable barren lands, water-logged soils and mountain slopes.

I claim:

1. An agricultural machine comprising a frame (1) carrying a hopper (2) for a fluid material and a device for causing the fluid material to move towards a working implement (3) for carrying out production operations in the field, characterized in that the hopper (2) is located in a sealed chamber (4) having an inlet communicated with a source (5) of working fluid supplied to the chamber (4) under pressure, the device comprising a driven drum (6) having a flexible hose (7) wound thereon and accommodated in the sealed chamber (4) in such a manner that the interior space (B) thereof communicates with the hopper (2) for a fluid material, the free end of the hose (7) extending through an outlet of the chamber (4), being turned inside out and sealingly secured to and along the perimeter of the chamber (4) so as to define an annular space (A), the volume of the annular space varying under pressure of working fluid to cause the fluid material to move.

2. An agricultural machine according to claim 1, characterized in that the drive of the drum (6) is reversible.

3. An agricultural machine according to claim 1, characterized in that the hopper (2) for a fluid material is formed by the inner walls of the hose (7).

4. An agricultural machine according to claim 1, characterized in that there are provided auxiliary hoppers (9) mounted outside the sealed chamber (4) and communicating with the interior space (B) of the hose (7) through a hollow shaft (8) of the drum (6).

5. An agricultural machine according to claim 1, characterized in that a traction member (12) is provided which has its ends secured to the hose (7).

6. An agricultural machine according to claim 5, characterized in that the traction member (12) has two runs.

7. An agricultural machine according to claim 1, characterized in that there is provided an auxiliary perforated hose (15) mounted coaxially with the first mentioned hose and having one end thereof secured thereto, the other end of the perforated hose (15) being secured to the surface of the field in the working position.

8. An agricultural machine according to claims 5 or 6 characterized in that the traction member (12) is operatively connected to the working implement (3) for carrying out production operations in the field, the working implement (3) comprising a transportation container (13), the traction member (12) extending around rollers (14).

9. An agricultural machine according to claim 8, characterized in that there is provided an auxiliary perforated hose (15) mounted coaxially with the first mentioned hose and having one end thereof secured thereto, the other end of the perforated hose (15) being secured to the surface of the field in the working position.

10. An agricultural machine according to claim 9, characterized in that the transportation container (13) is in the form of two sections (16, 17) mounted on either side of the flexible hose (7) and interconnected by a radius knife (18) engageable with the outer surface of the perforated hose (15).

* * * * *